United States Patent
Stecker

(10) Patent No.: US 9,880,279 B2
(45) Date of Patent: Jan. 30, 2018

(54) OBJECT SENSING USING DYNAMIC THRESHOLD HYSTERESIS

(71) Applicant: Banner Engineering Corporation, Minneapolis, MN (US)

(72) Inventor: John Alyn Stecker, Maple Lake, MN (US)

(73) Assignee: BANNER ENGINEERING CORPORATION, Minneapolis, MN (US)

( * ) Notice: Subject to any disclaimer, the term of this patent is extended or adjusted under 35 U.S.C. 154(b) by 348 days.

(21) Appl. No.: 14/150,977

(22) Filed: Jan. 9, 2014

(65) Prior Publication Data

US 2015/0192675 A1  Jul. 9, 2015

(51) Int. Cl.
  *G01S 17/00*  (2006.01)
  *G01S 17/02*  (2006.01)
  *G01S 7/487*  (2006.01)
  *G01V 8/12*  (2006.01)

(52) U.S. Cl.
  CPC .......... *G01S 17/026* (2013.01); *G01S 7/4873* (2013.01); *G01V 8/12* (2013.01)

(58) Field of Classification Search
  CPC ......... G01N 21/8851; G01N 21/95607; G01N 2201/0221; G01N 21/274; G01S 17/026; G01B 11/026; G06F 3/0421
  USPC ........................................... 356/442–448, 36
  See application file for complete search history.

(56) References Cited

U.S. PATENT DOCUMENTS

| | | | | |
|---|---|---|---|---|
| 3,723,738 A | * | 3/1973 | Brenner | G08B 13/187 250/221 |
| 5,463,384 A | * | 10/1995 | Juds | B60Q 9/008 340/435 |
| 5,507,037 A | * | 4/1996 | Bartkowiak | H04B 1/123 455/296 |
| 2002/0186372 A1 | * | 12/2002 | Haavig | G01N 15/0211 356/338 |
| 2005/0024641 A1 | * | 2/2005 | DeFreez | G01N 15/1429 356/343 |

FOREIGN PATENT DOCUMENTS

EP    002192419 A2 * 10/2009

* cited by examiner

*Primary Examiner* — Tri Ton
*Assistant Examiner* — Rebecca C Bryant
(74) *Attorney, Agent, or Firm* — Merchant & Gould P.C.

(57) ABSTRACT

A method and device for object detection are disclosed. In one aspect, a method comprises transmitting a plurality of signals into a region; measuring a noise level during a noise measurement time interval corresponding to each respective one of the plurality of transmitted signals; generating a threshold signal dependent on the noise level; and comparing a first plurality of signals received by a sensor, each of the received signals corresponding to a respective one of the plurality of the transmitted signals, with the respective threshold signal. In another aspect, a device comprising components adapted to carry out the steps of object detection is disclosed. In one example, a thresholding circuit is adapted to generate a threshold signal have a level corresponding to substantially a peak-to-peak level of the measured noise level.

20 Claims, 7 Drawing Sheets

OBJECT SENSING USING DYNAMIC THRESHOLD HYSTERESIS

This disclosure generally relates to detecting objects in monitored regions, and more particularly relates to methods and devices for detecting objects in environments where interfering signals, or noise, may be present.

Sensors, such as optical sensors, have been used to automatically monitor the presence of objects in certain defined regions for applications such as industrial safety and automation. In one example type of application, an optical device has a transmitter that emits pulsed light signals into a monitored region and a sensor that detects signals resulting from the interaction, such as reflection or scattering, between the transmitted light signals and any object located in the region. When an object is located in the monitored region, light signals above a threshold level may be detected as a result of transmitted light being reflected or scattered into the sensor. However, when light signals above a threshold is detected, the detected signals may be from noise sources, such as neighboring transmitters or lighting sources, rather than an object located in the monitored region. Various methods and devices have been used to reduce the chances of false assessment, e.g., determining that an object is in a monitored region when it is not, due to noise.

SUMMARY

This disclosure relates to methods and devices for detecting objects in a region (or detecting a retro target). In one aspect, an object detection method comprises transmitting a signal, such as an optical signal, from a transmitter into a region; measuring a signal, corresponding to the transmitted signal, received by a sensor; determining whether the received signal satisfies a condition; determining whether noise of at least a threshold amount is present; and determining whether an object is located within the region depending on whether the received signals meet the condition, the condition being different when noise present than not present.

A plurality of transmitted signals can be transmitted sequentially during a plurality of repetition time intervals, and the signals received by the sensor can be measured during each repetition time intervals and during a signal measuring time interval beginning at or after the onset of each transmitted signal. The condition may be, for example, that the received signal is above a threshold level (the "dark detect threshold") for indicating that an object is located in the region, or below a threshold level for indicating that an object is not located in the region. Noise can be measured during a noise measurement time interval in one or more of the repetition time intervals by measuring the signals received by a sensor, which can be the same sensor described above for measuring signals during the signal measurement time interval. A determination that noise of at least a threshold amount is present can be made, for example, when signals above a noise threshold level is detected during one or more noise measurement time intervals.

A determination that an object is located in the monitored region (or that a retro target is present) can be made, for example, if the signals measured during the signal measurement periods are above the threshold, optionally also for a predetermined number of consecutive repetition time intervals. When noise is present, a higher threshold is used to determine that an object is located in the monitored region. For example, the threshold can be set to have a specified relationship to the measured noise level. In one example, the threshold can be set approximately to the peak-to-peak noise level.

Once a determination that an object is located in the monitored region (or that a retro target is detected) is made, the signals measured during the signal measurement time intervals must be lower than a threshold level (the "light detect threshold"), optionally in a predetermined number of repetition time intervals (consecutive or a minimum fraction of a total number of intervals), before a determination is made that an object is not located in the monitored region.

Thus, the difference between "dark detect" and "light detect" thresholds, or threshold hysteresis, can be dynamically set, or varied depending on the noise level.

In another aspect of this disclosure, a device for detecting an object in a region (or detecting a retro target) comprises a transmitter, a sensor for detecting signals from the monitored region during the signal measurement time intervals, a noise detector and a controller. The controller is adapted to operate the transmitter to transmit signal, operate the sensor to measure the received signals and operate the noise sensor to measure noise. The controller is configured and adapted to determine whether an object is located in a region as described above. In one aspect of the disclosure,

DETAILED DESCRIPTION

Figure 1A:
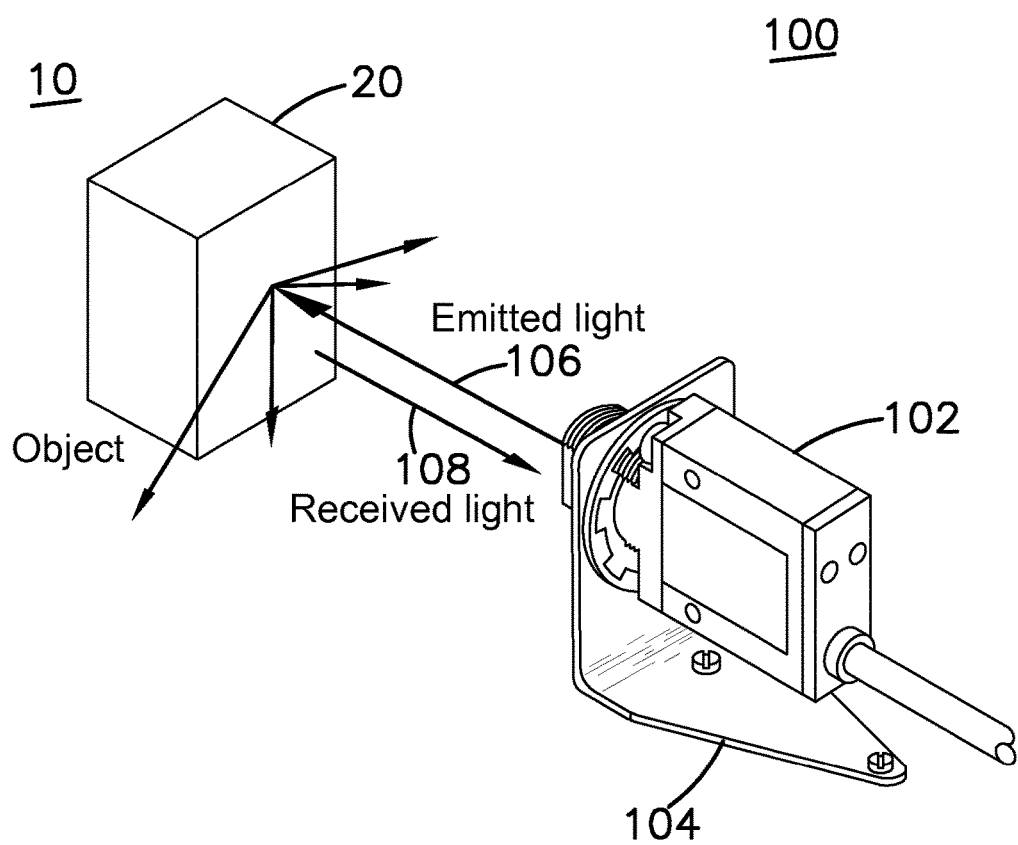
FIG. 1a schematically shows an object detecting device and its operating environment according to one aspect of this disclosure.

Machine sensing finds a wide range of applications. Devices for automatically detecting the presence of objects in a monitored region, for example, are used in applications such as industrial safety and automation. For such applications, it is desirable to quickly and accurately determine whether an object is present in a monitored region.

In one example application, an object detection device includes an optical emitter (or transmitter) and receiver (or sensor), which may be contained in the same housing (i.e., the device may be self-contained). The emitter emits a train of pulsed light signals and the device measures the signals received by the sensor to detect light reflected or scattered back from an object in the monitored region in order to determine if there is an object present.

To attain a desired degree of reliability of object detection, a process sometimes referred to as "demodulation" is used. In such a process, the signals received by the sensor are measured repeatedly and the measured signals must meet a certain requirement (such as being above or below a threshold level) a minimum number of times before the device determines whether an object is present in the monitored region. For example, a requirement can be that the sensor must receive signals above a particular threshold level ("dark detect" threshold) for a number (sometimes referred to as "demodulation count") (e.g., four) consecutive repetition time intervals (sometimes referred to as "rep-rates") for the device to determine that an object is present in the monitored region and to change the state of an object-presence indicator from the "dark" state to the "light" state. Here, "light" state means the device has determined that an object is present in the monitored region (and the measure signals resulted from the transmitted signals being reflected or scattered by the object); and "dark" state means no object is present in the monitored region.

Conversely, for an object detecting device to change from a "light" state to a "dark" state, there must be no light (or no light above a threshold level ("light detect" threshold)) returned for, e.g., four (4) rep-rates.

However, even with demodulation, chances for false detection exist when noise is present. Measured signals may reach levels above threshold due to noise, including interfering light pulses from other nearby sensor devices and environmental noises such as light from building lighting fixtures. Objects may thus be determined to be present in a monitored region when they are not.

Example methods and devices disclosed in the present disclosure provide dynamic thresholding (or dynamic threshold hysteresis), i.e., using a threshold level that is dependent on the detected noise level, to achieve a high level of reliability. In certain examples, a dark detect threshold that bears a specified relationship to the noise level is used. In one example, the output signal of an analog noise peak detection circuit is used as to increase the dark detect threshold, such that a signal approximating 2× the maximum noise level (during a noise detection period) is used as the threshold.

Figure 1B:
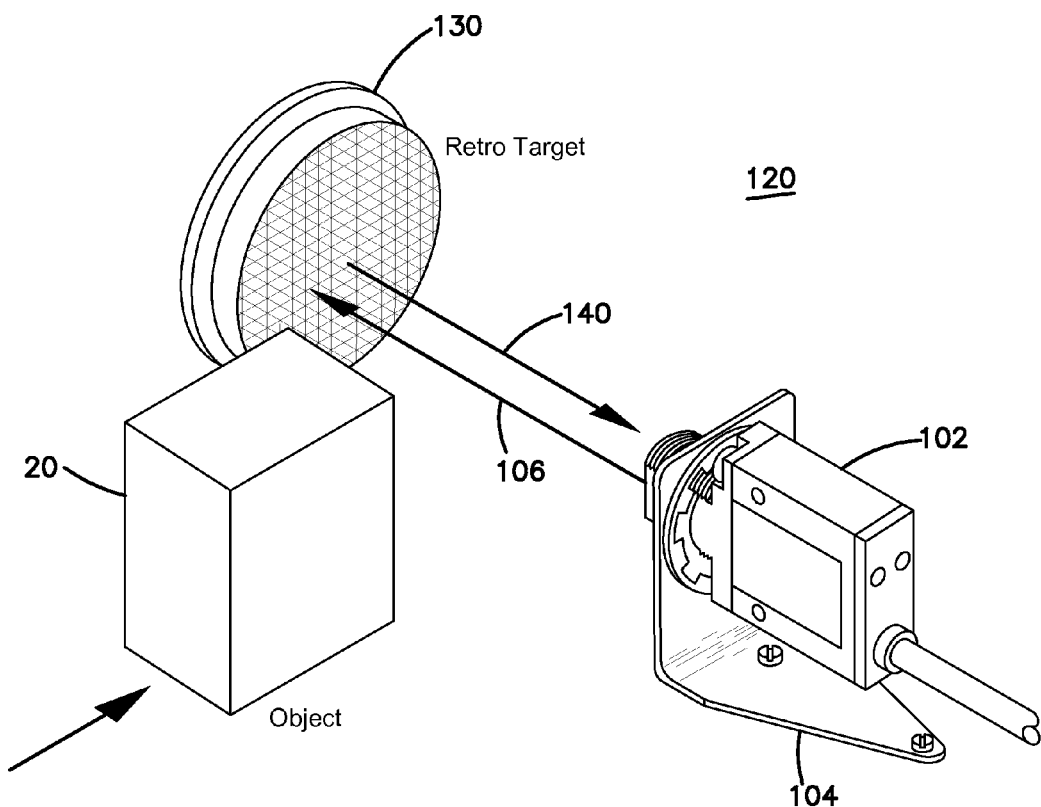
FIG. 1b schematically shows an object detecting device and its operating environment according to another aspect of this disclosure.

As an example, referring to FIG. 1a, in a diffuse mode, an object detecting device 100, which can be an optical detector, includes an optical transmitter (not explicitly shown) disposed in the housing 102, which is mounted on a support 104, for transmitting pulsed light 106 to a monitored region 10. If an object 20 is present in the monitored region 10, the object 20 interacts with the transmitted light 106, and at least a portion of the product of that interaction, such as scattered or reflected light 108, can be received by a sensor (not explicitly shown), which can also be disposed in the housing 102, in the device 100. In another example, depicted in FIG. 1b, in a retro- or polarized retro mode, the object detecting device 120 transmits a signal 106 to a retro target 130 and receives a reflected signal 140 when no object is present in the monitored region. When an object enters the monitored region, the transmitted signal 106 and/or reflected signal 140 are blocked by the object 20, and the sensor in device 120 does not receive any signal reflected by the retro target 130.

An electronic controller (not explicitly shown in FIG. 1a or 1b), which can reside inside, partially inside or outside the housing 102, controls the transmission of the transmitted light 106 and measures the signals received by the sensor and makes determinations characterizing the signals and noise received by the sensor, and on whether an object is present in the monitored region 10 based on the signals and noise received.

Figure 2A:
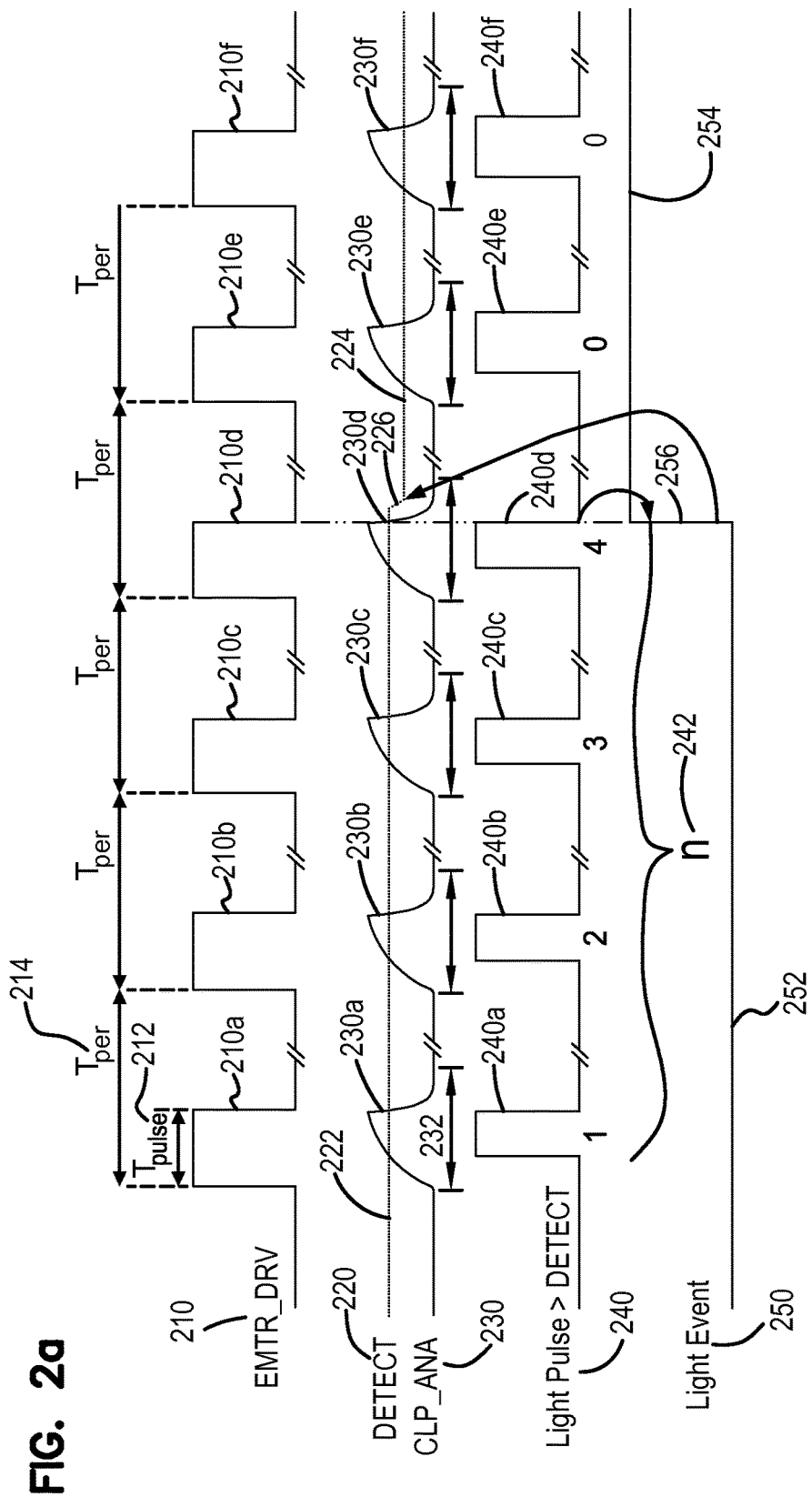
FIG. 2a schematically shows the various signals leading to a determination that an object is located in a monitored region according to an aspect of the disclosure.

For example, as illustrated in FIG. 2a, in an example method for determining, a transmitter (or emitter) is driven to transmit a signal 210 comprising a sequential series of light pulses 210a-f, each having a pulse width, $T_{pulse}$ 212, and transmitted during a repetition time interval, $T_{per}$ 214. For each transmitted pulse 210a-f, the signal received by the sensor is measured during a signal measurement time interval 232, which can begin, for example, at or after the onset of each transmitted pulse 210a-f. See, also, FIG. 5. The measured signals 230a-f are compared with an object detection threshold level 220. If a measured signal exceeds the threshold level 220, a condition consistent with detecting reflection of a transmitted signal by an object in the monitored region is determined to be met, as indicated by a change of state in a light-pulse-detect signal 240, e.g., one of light-pulse-detect pulses 240a-f. Upon detecting a certain number, n (242), of light-pulse-detect pulses in a certain number of repetition time intervals, an object is determined to be present in the monitored region, as indicated by a change of state in a "light-event" signal 250. In the example shown in FIG. 2a, if light-pulse-detect signals are detected in four (n=4) consecutive repetition time intervals 214, the light-event signal 250 changes from a first state 252 to a second state 254.

The example in FIG. 2a illustrates a time sequence that begins with the detection device in a "dark" state (corresponding to the first signal level 252 of the light-event signal 250), i.e., where no object was determined to be present in the monitored region, and the device is configured to detect when the monitored region becomes occupied by an object. In the "dark" state, the object detection threshold ("dark detect" threshold) level 220 is set at a higher value 222. Upon determining that an object is present in the monitored region, the device switches to a "light" state (corresponding to the second signal level 254 of the light-event signal 250). Upon transition from a "dark" state to a "light" state (or transition point 256 in the light-event signal 250), the threshold level transitions (226) to a lower level 224 ("light detect" threshold). The device becomes configured to determine when the monitored region becomes empty.

Figure 2B:
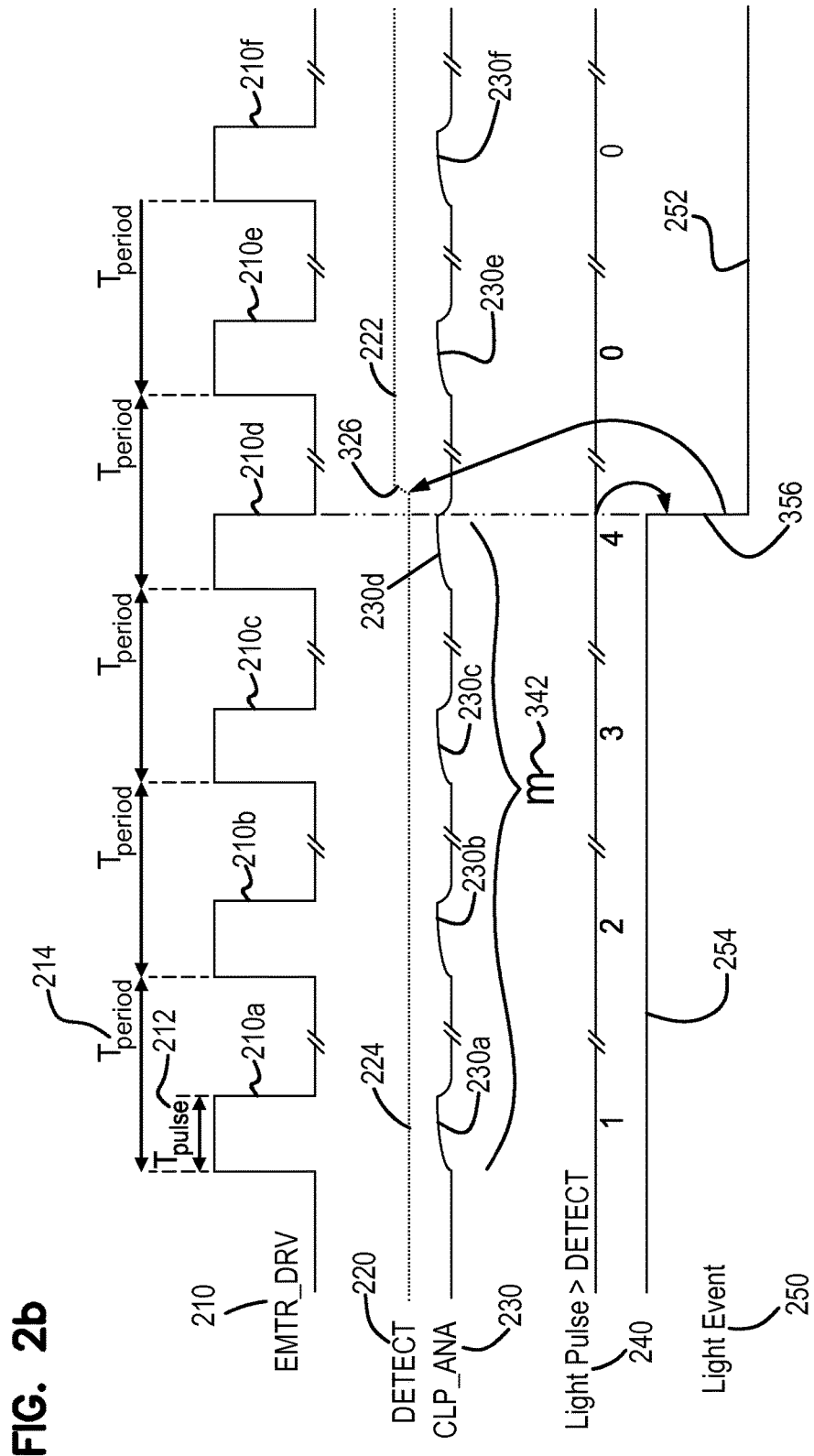
FIG. 2b schematically shows the various signals leading to a determination that an object is not located in a monitored region according to an aspect of the disclosure.

An example of light-to-dark transition, i.e., a process for determining that the monitored region is no longer occupied, is illustrated in FIG. 2b. Here, the signal 230 received by the sensor is compared with the lower, light detect, threshold level 224, and if the signal 230 is below the threshold level 224, the light-pulse-detect signal does not change state (e.g., remains low). Upon determining that a certain number, m (342), of light-pulse-detect pulses in a certain number of repetition time intervals are low, or have undergone no change of state, an object is determined to be not present in the monitored region, as indicated by a change of state in the "light-event" signal 250, from the second state 254 to the first state 252. In the example shown in FIG. 2b, if light-pulse-detect signals are "low" in four (m=4) consecutive repetition time intervals 214, the light-event signal 250 changes from second state 254 to the first state 252, and the detection device 100 switches to the "dark" state. The object detection threshold level 220 is switched (326) to the higher, dark detect, level 222, and the device becomes configured to determine when the monitored region becomes occupied.

Figure 3:
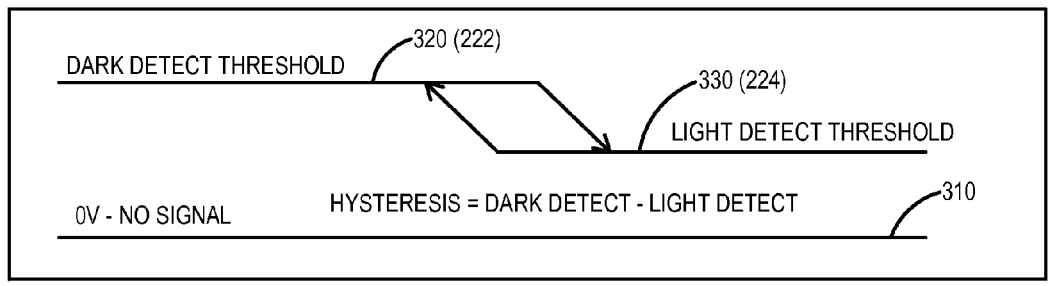
FIG. 3 schematically shows threshold hysteresis according to an aspect of the disclosure.

FIG. 3 schematically shows an example of a threshold hysteresis loop, in which the dark detect threshold 320 (or 222 in FIGS. 2a and 2b) and light detect threshold 330 (or 224 in FIGS. 2a and 2b) (both referenced to a reference point 310, which in this example is 0V) are alternately used as described above. At least the dark detect threshold 320 is noise dependent.

According to another aspect of the disclosure, noise received by the sensor is also measured during at least one repetition time interval 214. The noise can be measured from the same sensor that is used to detect the reflected signal during the signal measurement time interval 232, or it can be measured indirectly from a different sensor the output which bears a known relationship to the sensor for reflected signal.

Figure 4:
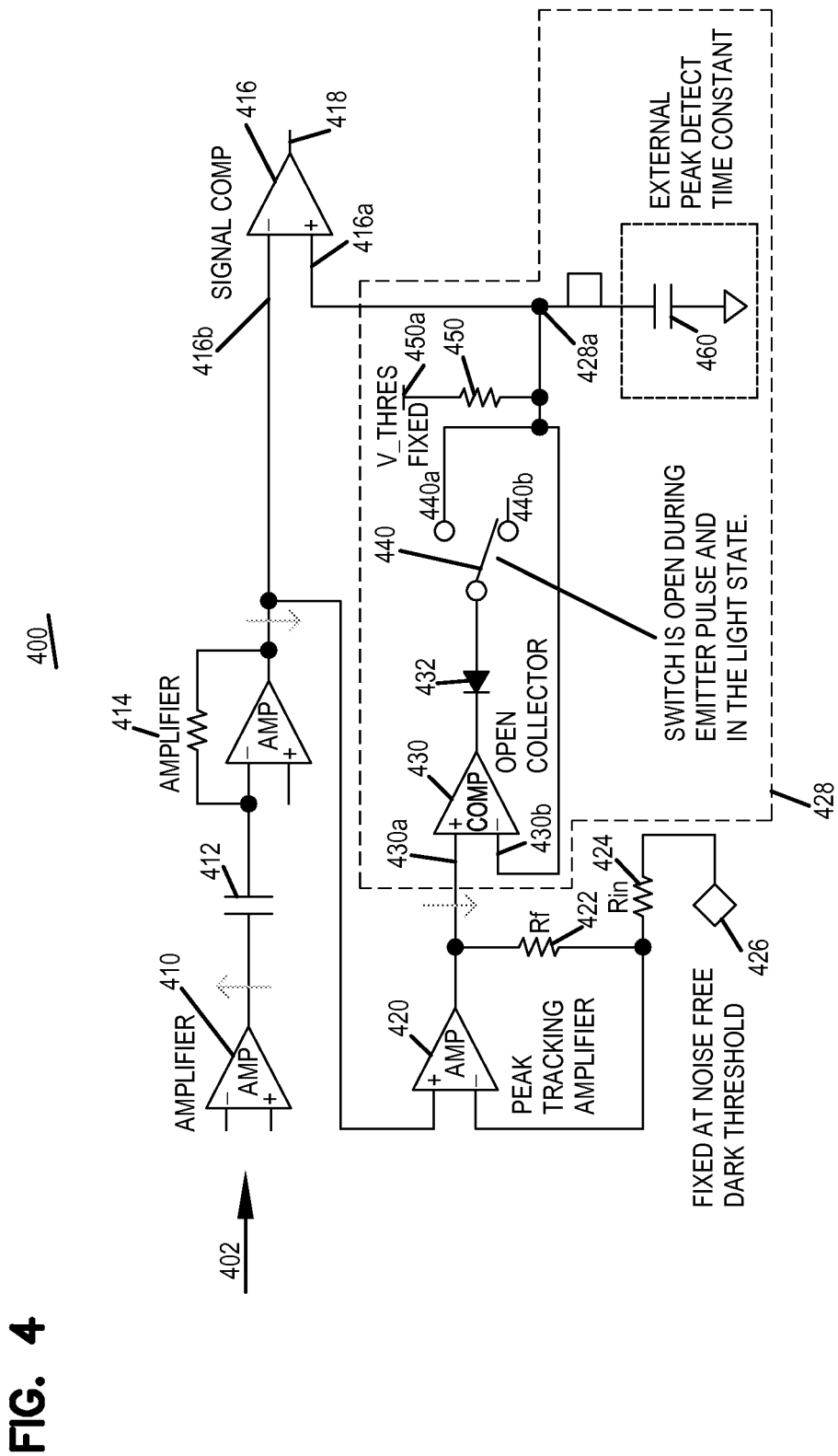
FIG. 4 shows a diagram of a circuit for dynamically setting the dark detect threshold according to an aspect of the disclosure.

In one example, as illustrated in FIG. 4, a signal and noise evaluation circuit 400 is used to measure both reflected signals and noise from the same sensor (not shown). The output 402 of the sensor is received into an amplifier 410, the output 412 of which is fed to an amplifier 410, which is coupled by a capacitor 411 to a second amplifier 414. The output of the second amplifier 414 is fed to one input 416b of a comparator 416 for comparing the received signal (such as 108 in FIG. 1a or 140 in FIG. 1b) with a threshold voltage at another input 416a. The output 418 of the comparator 416 is at one level that is indicative of the presence of an object or a retro target when the magnitude of the signal at signal input 416b is greater than the magnitude of the threshold level at the reference input 416a; the output 418 of the comparator 416 is at another level that is indicative of the absence of an object or a retro target when the magnitude of the signal at signal input 416b is smaller than the magnitude of the threshold level at the reference input 416a.

Figure 6:
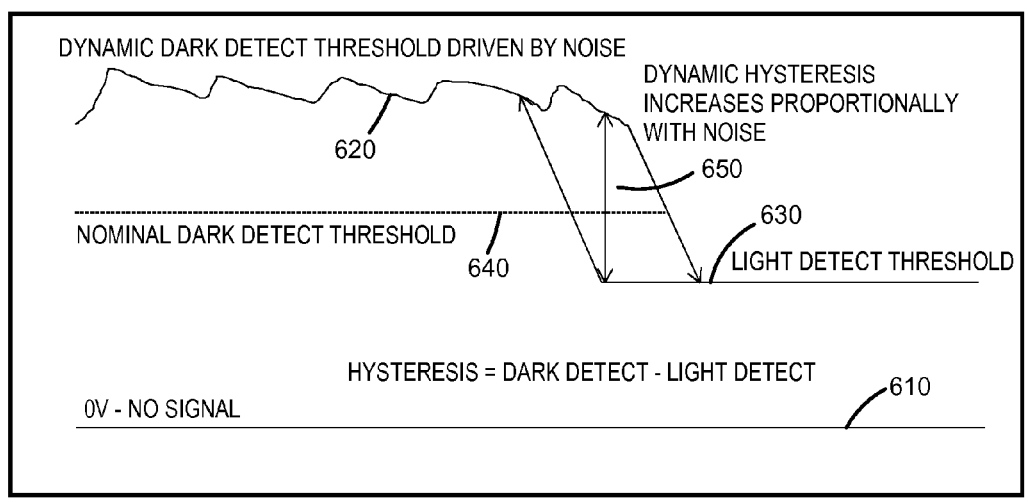
FIG. 6 schematically shows an example of dynamic threshold hysteresis setting, where the dynamic hysteresis is set at approximately the peak-to-peak noise level, according to an aspect of the disclosure.

The remainder of the circuit shown in FIG. 4 generates the threshold voltage threshold voltage from the output of the second amplifier 414 during, for example, the noise detection period. An amplifier 420, together with resisters $R_f$ 422 and $R_{in}$ 424, form a third amplifier for amplifying noise signal from the second amplifier 414 and outputting the amplified signal to the input 430a of a peak detector circuit 428, which includes a comparator 430, diode 432, switch 440 (which can be an electronic switch controlled by a microprocessor or microcontroller), output resistor 450 and capacitor 460. The resistor $R_{in}$ 424 is biased at terminal 426 at a voltage corresponding to the noise-free dart detect threshold (640 in FIG. 6) so that the peak detector circuit 428 detects the peak noise only when the noise level is sufficiently above the noise-free dark detect threshold. The this example, the output resistor 450 is connected between the output 428a of the peak detector circuit 428 and a fixed voltage supply 450a, which in this case is biased at the same voltage as the terminal 426 of the resister $R_{in}$ (424), i.e., a voltage corresponding to the noise-free dart detect threshold 640. The peak detector circuit 428 is put in a peak-detect mode when the switch 440 is put in a closed position 440a and connects the cathode of the diode 433 to the input 430b of the comparator 430.

In operation, in one example, the switch 440 sets the peak detector circuit 428 in the peak-detect mode during a noise detection period when the sensor is in the dark state. In the peak-detect mode, the output 428a of the peak detector circuit 428 is at a level 620 (see FIG. 6) that approximately the peak noise level. When it is time to fire the emitter and detect the received signal, the switch 440 is switched to an open position 440b. The voltage at the output 428a is initially at approximately the peak noise level but decays toward a voltage corresponding to the noise-free dark detect threshold 640 with a time constant determined by the capacitance value of the capacitor 460 and resistance value of the output resister 450. For a sufficiently short period of time for received signal detection, the voltage at the output 428a, and therefore the input 416a of the comparator 416, is approximately the peak noise level. The dark detect threshold level 620, or the threshold hysteresis 650, is therefore dynamically set according to the level of noise present.

Figure 5:
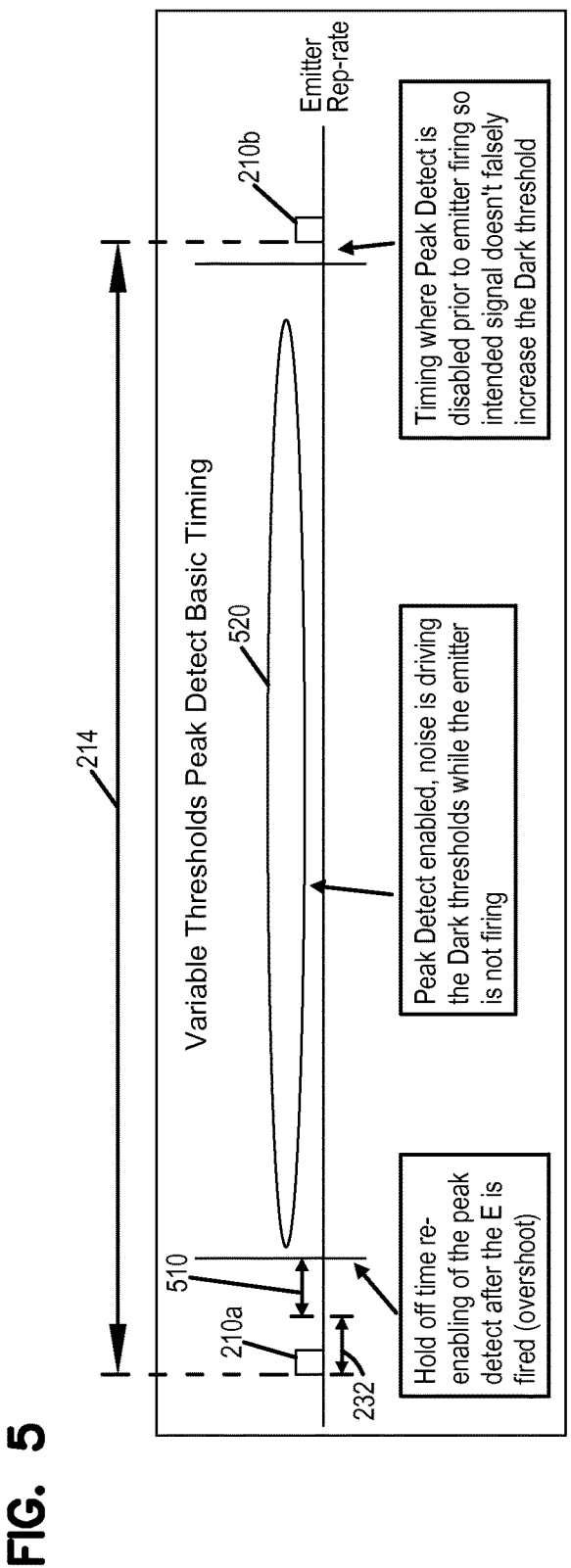
FIG. 5 schematically shows the time intervals for the various steps in a method for detecting an object according to an aspect of the disclosure.

As illustrated in FIG. 5, noise can be measured in a noise measurement time interval (or "noise evaluation window") 520 within one or more repetition time intervals 214. In one example, noise measurement can be done by peak detection, which is performed by a noise detection circuit, such as the one shown in FIG. 4. The noise measurement time interval 520 can begin after the signal measurement time interval 232, preferably with an intervening period 510 to allow any remaining signal left over from the signal measurement time interval 232 to settle.

CONCLUSION

A method and device have been disclosed, in which a threshold level for determining that a signal has been received is dynamically set based on the noise level detected. For determining that an object is present (or, alternatively, that no object is blocking a transmitted light or light reflected from a retro target) a higher threshold level is used; a lower threshold level is used when no noise is present. The increased threshold hysteresis improves the reliability of object detection.

Because many embodiments of the invention can be made without departing from the spirit and scope of the invention, the invention resides in the claims hereinafter appended.

We claim:

1. A device for object detection, comprising:
    a transmitter adapted to transmit a periodic optical pulse signal into a region, wherein light periods are associated with a transmission duration of each pulse in the periodic optical pulse signal, and dark periods are associated with the time between consecutive pulses in the periodic optical pulse signal;
    a sensor adapted to output a detected signal based on detection of a reflected optical signal corresponding to each pulse in the periodic optical pulse signal, and output a noise signal based on detection of ambient optical noise from the region;
    a module adapted to generate a dynamic dark threshold, the dynamic dark threshold having a level dependent on a level of the noise signal, wherein during the dark periods, the module is configured to measure a peak-to-peak noise signal to determine the level of the dynamic dark threshold, and during the light periods, the module sweeps the dynamic dark threshold from an initial level dependent upon the measured peak-to-peak noise signal toward a predetermined noise-free dark threshold level, such that the minimum strength of the reflected optical signal required for the detected signal to cross the dynamic dark threshold is positively correlated with the peak-to-peak noise signal; and,
    a comparator adapted to compare the detected signal with the dynamic dark threshold, and adapted to output a light-pulse-detect signal.

2. The device of claim 1, further comprising a switching device adapted to selectively connect, during substantially the entire dark period, the dynamic dark threshold to a peak detector arranged to follow the peak-to-peak noise signal.

3. The device of claim 1, wherein a light threshold has a level that differs from the predetermined noise-free dark threshold level by a predetermined hysteresis, wherein when the light threshold is provided to the comparator, the minimum strength of the reflected optical signal required to cross the light threshold is less than the minimum strength of the reflected optical signal required to cross the dynamic dark threshold.

4. The device of claim 3, wherein the predetermined hysteresis is injected onto the detected signal before reaching the comparator.

5. The device of claim 3, wherein the predetermined hysteresis is injected onto the dynamic dark threshold signal before reaching the comparator.

6. The device of claim 3, further comprising a controller adapted to provide for hysteresis by supplying the light threshold to the comparator after n consecutive detected signals are determined to cross the dynamic dark threshold, and supplying the dynamic dark threshold to the comparator after m consecutive detected signals are determined not to cross the light threshold.

7. The device of claim 6, wherein the module is further adapted to generate a light-event signal, wherein after n consecutive detected signals are determined to cross the dynamic dark threshold, the light event signal transitions to a light state, and after m consecutive detected signals are determined not to cross the light threshold, the light event signal transitions to a dark state.

8. The device of claim 1, wherein the module comprises a circuit having a voltage follower with a non-unitary gain, a peak-tracking detector, and an RC sub-circuit.

9. The device of claim 1, wherein the sweeping of the dynamic dark threshold from an initial level dependent upon the measured peak-to-peak noise signal toward the predetermined noise-free dark threshold level has the form of an exponential sweep.

10. The device of claim 1, wherein the dynamic dark threshold is at a level higher than the predetermined noise-free dark level based on the level of the noise signal.

11. An object detection method comprising:
transmitting, via a transmitter, a periodic optical pulse signal into a region, wherein light periods are associated with a transmission duration of each pulse in the periodic optical pulse signal, and dark periods are associated with the time between consecutive pulses in the periodic optical pulse signal;
detecting, via a sensor adapted to output a detected signal, a reflected optical signal corresponding to each pulse in the periodic optical pulse signal;
outputting, from the sensor, a noise signal based on detection of ambient optical noise from the region;
generating a dynamic dark threshold, the dynamic dark threshold having a level dependent on a level of the noise signal;
during the dark periods, measuring a peak-to-peak noise signal to determine the level of the dynamic dark threshold;
during the light periods, sweeping the dynamic dark threshold from an initial level dependent upon the measured peak-to-peak noise signal toward a predetermined noise-free dark threshold level, such that the minimum strength of the reflected optical signal required for the detected signal to cross the dynamic dark threshold is positively correlated with the peak-to-peak noise signal; and,
comparing, via a comparator, the detected signal with the dynamic dark threshold, and outputting a light-pulse-detect signal.

12. The method of claim 11, further comprising selectively connecting, during substantially the entire dark period, the dynamic dark threshold to a peak detector arranged to follow the peak-to-peak noise signal.

13. The method of claim 11, wherein a light threshold has a level that differs from the predetermined noise-free dark threshold level by a predetermined hysteresis, wherein when the light threshold is provided to the comparator, the minimum strength of the reflected optical signal required to cross the light threshold is less than the minimum strength of the reflected optical signal required to cross the dynamic dark threshold.

14. The method of claim 13, further comprising providing for hysteresis by supplying, via a controller, the light threshold to the comparator after n consecutive detected signals are determined to cross the dynamic dark threshold, and supplying, via the controller, the dynamic dark threshold to the comparator after m consecutive detected signals are determined not to cross the light threshold.

15. The method of claim 14, further comprising generating a light-event signal, wherein after n consecutive detected signals are determined to cross the dynamic dark threshold, the light event signal transitions to a light state, and after m consecutive detected signals are determined not to cross the light threshold, the light event signal transitions to a dark state.

16. The method of claim 11, wherein the dynamic dark threshold is at a level higher than the predetermined noise-free dark level based on the level of the noise signal.

17. A device for object detection, comprising:
a transmitter adapted to transmit a periodic optical pulse signal into a region, wherein light periods are associated with a transmission duration of each pulse in the periodic optical pulse signal, and dark periods are associated with the time between consecutive pulses in the periodic optical pulse signal;
a sensor adapted to output a detected signal based on detection of a reflected optical signal corresponding to each pulse in the periodic optical pulse signal, and output a noise signal based on detection of ambient optical noise from the region;
means for generating a dynamic dark threshold, the dynamic dark threshold having a level dependent on a level of the noise signal, wherein during the dark periods, said generating means is configured to measure a peak-to-peak noise signal to determine the level of the dynamic dark threshold, and during the light periods, said generating means sweeps the dynamic dark threshold from an initial level dependent upon the measured peak-to-peak noise signal toward a predetermined noise-free dark threshold level, such that the minimum strength of the reflected optical signal required for the detected signal to cross the dynamic dark threshold is positively correlated with the peak-to-peak noise signal; and,
means for comparing the detected signal with the dynamic dark threshold, wherein said comparing means is adapted to output a light-pulse-detect signal.

18. The device of claim 17, further comprising a switching device adapted to selectively connect, during substantially the entire dark period, the dynamic dark threshold to a peak detector arranged to follow the peak-to-peak noise signal.

19. The device of claim 17, wherein a light threshold has a level that differs from the predetermined noise-free dark threshold level by a predetermined hysteresis, wherein when the light threshold is provided to said comparing means, the minimum strength of the reflected optical signal required to cross the light threshold is less than the minimum strength of the reflected optical signal required to cross the dynamic dark threshold.

20. The device of claim 19, further comprising a controller adapted to provide for hysteresis by supplying the light threshold to said comparing means after n consecutive detected signals are determined to cross the dynamic dark threshold, and supplying the dynamic dark threshold to said comparing means after m consecutive detected signals are determined not to cross the light threshold.

* * * * *